(12) United States Patent
Guay

(10) Patent No.: US 9,057,402 B2
(45) Date of Patent: Jun. 16, 2015

(54) SPACERS FOR ROLLING BEARINGS WITH ADJUSTED LENGTHS

(75) Inventor: Michel Pascal Noel Guay, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 992 days.

(21) Appl. No.: 12/955,511

(22) Filed: Nov. 29, 2010

(65) Prior Publication Data

US 2011/0129177 A1 Jun. 2, 2011

(30) Foreign Application Priority Data

Nov. 30, 2009 (FR) ...................................... 0958471

(51) Int. Cl.
*F16C 33/04* (2006.01)
*F16C 25/08* (2006.01)
*F16C 19/52* (2006.01)

(52) U.S. Cl.
CPC ........... *F16C 25/08* (2013.01); *Y10T 29/49643* (2015.01); *F16C 19/525* (2013.01)

(58) Field of Classification Search
CPC ...... F16C 25/08; F16C 25/083; F16C 19/525; F16C 19/522; F16C 2229/00; Y10T 29/49643
USPC ................. 384/493, 544, 557, 589, 905, 551; 29/898.09
See application file for complete search history.

(56) References Cited

U.S. PATENT DOCUMENTS

| 6,158,895 A | 12/2000 | Date |
| 6,409,390 B1 * | 6/2002 | Bouzakis et al. ............. 384/517 |
| 2009/0263062 A1 * | 10/2009 | Smith et al. .................. 384/476 |

FOREIGN PATENT DOCUMENTS

| JP | 5079514 | 3/1993 |
| WO | 9923390 | 5/1999 |

OTHER PUBLICATIONS

Machine translation of Jp h05-079514.*
French search report dated Jul. 28, 2010 in corresponding FR 0958471.

* cited by examiner

*Primary Examiner* — Marcus Charles
*Assistant Examiner* — Yamilka Pinero Medina
(74) *Attorney, Agent, or Firm* — Young & Thompson

(57) ABSTRACT

A rolling bearing device, of the type including a central shaft and a hub (10) mobile in rotation relative to each other, the bearing including at least two rolling bearings (12, 13), one designated "lower" and the other designated "upper", arranged between the central shaft (11) and the hub (10) in two positions spaced in the axial direction Z, these rolling bearings being fitted with inner (14, 16) and outer (15, 17) rings and with balls (18, 19), the rolling bearings being assembled back-to-back or face-to-face, a rigid preload being applied to these bearings along the axial direction Z, internal (22) and external (23) spacers being arranged between these rolling bearings, the inner (22) and outer (23) spacers have lengths adjusted to limit variations in rigid preload caused by temperature gradients from one point of the bearing to another to less than 30%, particularly thermal gradients in the radial direction.

14 Claims, 2 Drawing Sheets

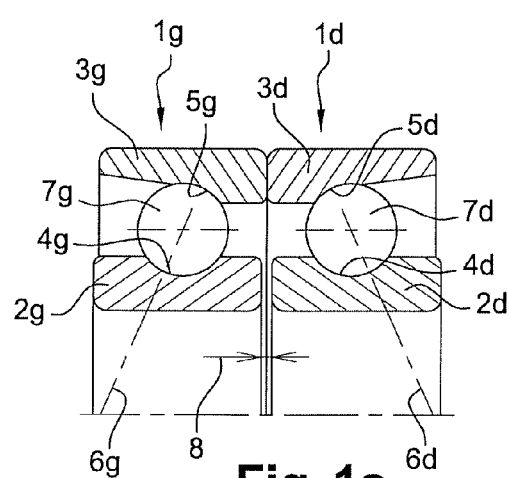
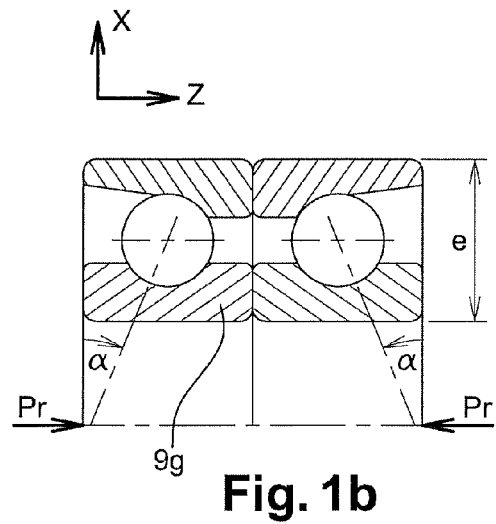
Fig. 1a  Fig. 1b
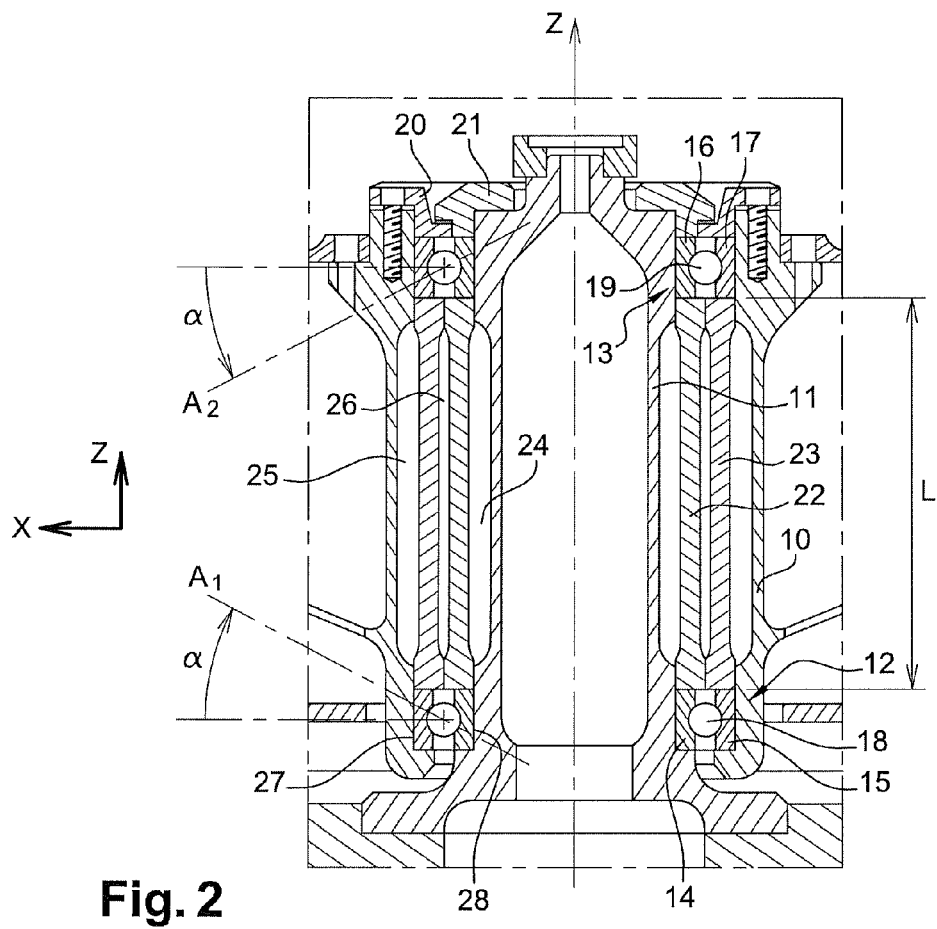
Fig. 2

SPACERS FOR ROLLING BEARINGS WITH ADJUSTED LENGTHS

The invention belongs to the field of rolling bearings. It relates more specifically to bearings subjected to temperature gradients.

BACKGROUND OF THE INVENTION AND PROBLEM STATEMENT

Ball bearings have been used for decades in a considerable number of devices comprising mechanisms moving in rotation. Their role is to limit the friction between two members, one of which, the rotor, is mobile in rotation relative to the other, the stator, which is fixed to the base, replacing the phenomenon of sliding between the two members by a phenomenon of rolling. A ball or tapered rolling bearing is usually composed of two coaxial rings comprising raceways between which a set of rolling elements (balls or rollers) is arranged the spacing of which is kept constant. The rest of this description will be limited to the case of ball bearings, even though the invention is not limited to this case.

In this way, friction between the rotating members is considerably reduced, consequently reducing the energy required to keep the rotor in rotation or the thermal heating between these members.

The bearings' rings and the balls are typically made of metal, usually of bearing steel. Steel rings and ceramic balls are also used for some applications. Full ceramic bearings also exist.

As an improvement, it is common to produce a rolling bearing by combining a pair of ball bearings arranged between the rotor and the stator to keep them perfectly coaxial, so as to create a pivot linkage.

By "shaft" is meant the part of the member in contact with the bearings' inner rings; this member is either the stator when the central element of the bearing is fixed relative to the base or the rotor when the central element of the bearing is rotating relative to the base. By "hub" is meant the portion of the member in contact with the bearings' outer rings; this member is either, inversely to the shaft, the rotor or the stator. In all cases, the hub wraps around the shaft.

Such rolling bearings are typically used in mechanisms such as driving devices, machine tool spindles, turbines, pointing mechanisms, precision machinery, momentum wheels, such a momentum wheel being for example used in a satellite attitude control application.

During their assembly and operation, the various members making up a ball bearing are naturally subjected to deformation, resulting in the appearance of mechanical play between the members which may be detrimental either to the performance of the rolling bearings or to the precise pointing of the hub.

For precision mechanisms of the type mentioned above, ball bearings known as preloaded ball bearings are used to eliminate such play and to ensure good pointing accuracy. Preloading a pair of rolling bearings consists of applying permanently an axial tightening force on the bearings' sides. This force causes an elastic deformation between the raceways and balls and generates a contact pressure, which allows the play to be eliminated.

To control and optimize the friction, paired rolling bearings are often used, to which a preload is applied as shown by FIGS. 1a and 1b.

In FIG. 1a, which illustrates a bearing that has not yet been preloaded, two ball bearings 1g, 1d are juxtaposed. Only half of the bearings are shown, the bearings' axis of symmetry Z being horizontal in the figure. The inner 2g, 2d and outer 3g, 3d rings are shown in cut view. In this example, the inner raceways 4g, 4d, and the outer raceways 5g, 5d define normals 6g, 6d in contact with the balls tilted at a predefined specific angle of contact α. The normals 6g and 6d converging towards the outside of the bearings, this is called a back-to-back assembly. Inverting the bearings 1g and 1d would lead to an assembly configuration called "face-to-face" in which the normals in contact would converge towards the inside of the paired bearing. The balls 7g, 7d are simply in contact with their respective internal and external raceways. On purpose, some play 8 remains between the two inner rings 2g, 2d, whereas the two outer rings 3g, 3d are in contact.

In the configuration of FIG. 1b, a preload is applied as an axial force Pr, tightening the inner rings 2g, 2d against each other. Here, this preload causes an elastic deformation 9g, 9d (greatly exaggerated here for the purposes of the figure) of each ball 7g, 7d and of the raceways, preventing the emergence of play in the assembly. When the play is removed by applying the preload, the oblique angle of contact α increases slightly (typically by a few percent). The resulting angle of contact is known and produced to within a few degrees by bearing manufacturers, typically in a range varying from 10 to 40 degrees.

There are many ways to achieve this preload. The preload is called "rigid" when it is obtained by imposing the motion of one ring relative to the other. Only the case of rigid preloads will be considered here.

The preload is thus an important property of the rolling bearing. It helps conferring to it a defined and controlled stiffness. It also has a direct influence on the allowable loading level and rotor speed. The challenge for the designer is to ensure a controlled and steady preload over time.

The following is an embodiment known from the state of the art that provides both a rigid preload and an adequate rocking stiffness of the bearing, i.e. around axes perpendicular to the bearing rotation axis.

A rolling bearing device, of the type comprising a central shaft and a hub mobile in rotation relative to each other, comprises at least two rolling bearings, one designated "lower" and the other designated "upper", arranged between the central shaft and the hub in two positions spaced in the axial direction (i.e. by definition along the Z axis). These rolling bearings comprise inner and outer rings and balls; the inner ring of each bearing is adjusted around the central shaft and the outer ring is adjusted inside the hub; the bearings are mounted back-to-back or face-to-face. A rigid preload is applied to these rolling bearings in the axial direction. Spacers are placed between the rolling bearings; with a spacer designated "inner" resting, by its upper and lower ends, on the inner rings of the upper and lower rolling bearings, respectively; a spacer designated "outer" resting, by its upper and lower ends, on the outer rings of the upper and lower rolling bearings, respectively.

A rigid preload is applied to the bearings in the axial direction using assembly elements designed for this purpose. For example, mounting flanges are used to tighten the bearings' rings onto the spacers.

This type of mounting is advantageous because it allows the bearings to be spaced out at an adjustable distance depending on the length of the spacers. According to the state of the art, the length of the spacers is chosen to be sufficiently large to provide with a high pointing accuracy and with the required rocking stiffness. The longer the spacers are, the greater the bearing's rocking stiffness will be. However, according to this state of the art, the spacers will have the minimum length allowing the required stiffness to be achieved in order to minimize the size and weight of the bearing.

This device, which is advantageous in terms of rocking stiffness, bulk and weight, has nevertheless a significant limitation for some applications that require the preload to remain substantially constant during temperature changes.

It is clear indeed that the preload is substantially altered when a ball bearing is subjected to a variation of temperature. It may increase, which degrades the friction torque and the life duration of the members in contact owing to wear. It may also decrease to the point where the preload is completely lost, in which case the resulting mechanical backlash degrades the pointing accuracy as well as the life duration, due to shocks generated within the bearing.

Two types of temperature variations are considered here: excursions and gradients:
  temperature excursion refers to a uniform temperature variation, with a rolling bearing homogeneous in temperature, this one varying over time;
  temperature gradient refers to a temperature variation in space, from one end to the other of the bearing. A radial gradient (where the shaft is warmer or colder than the hub) alters the preload significantly. In contrast, an axial gradient (one rolling bearing is warmer than the other) has little effect on the preload.

A temperature excursion occurs frequently during operation of the system, for example because the bearings heat up especially at high rotational speeds or because of the presence of dissipative elements operating in close proximity, such as electronics, for example.

A temperature gradient is commonly occurring because the stator has a high thermal coupling with the base, whereas the thermal conduction from the rotor to the base passes through the bearings' balls that only provide a reduced thermal path, especially when they are made of low thermal conductivity materials, in particular in the case of ceramic balls.

In order to limit the preload variation in the case of a temperature excursion, it is known to use exclusively for all the parts of the bearing (including the balls) only materials that have the same thermal dilatation coefficient (also known as coefficient of thermal expansion or coefficient of thermoelastic expansion), for example steel. This yields a preload that remains constant when the bearing is subjected to a temperature excursion, because the excursion generates an isotropic expansion of the bearing, the axial and radial expansions being proportional, with a contact angle that remains constant.

In contrast, even in this case of materials with the same coefficient of expansion, when the bearing is subjected to a radial temperature gradient, the expansion of the bearing is no longer isotropic and the axial and radial expansions are only partially offset, with an oblique angle of contact that varies significantly. The preload can be affected significantly by this.

OBJECTIVES OF THE INVENTION

The objective of this invention is therefore to address this problem by proposing a new arrangement of preloaded rolling bearings, designed to take temperature gradients into account.

DESCRIPTION OF THE INVENTION

To this end, the invention relates primarily to a rolling bearing device of the type comprising a central shaft and a hub, mobile in rotation relative to each other, wherein the bearing comprises at least two rolling bearings, one designated "lower" and the other designated "upper", arranged between the central shaft and the hub in two positions spaced in the axial direction Z, these bearings comprising inner and outer rings and balls, the inner ring of each bearing being adjusted around the central shaft and the outer ring inside the hub, the rolling bearings being mounted back-to-back or face-to-face, a rigid preload being applied to these bearings in the axial direction, spacers being placed between these bearings, with a spacer designated "inner" resting, by its upper and lower ends, on the inner rings of the upper and lower bearings, respectively; a spacer designated "outer" resting, by its upper and lower ends, on the outer rings of the upper and lower rolling bearings, respectively.

The rolling bearing device is such that the lengths of the spacers, both "inner" and "outer", are adjusted to limit variations in rigid preload caused by temperature gradients from one point of the bearing to another to less than 30%, particularly thermal gradients in the radial direction, being understood that for the optimum length of the spacers, the effect of the differential axial expansion of the spacers on the preload, going in the direction of an increased preload, will offset the effect of differential radial expansion of the rings on this same preload, along the lines of a decreased preload.

The lengths of the spacers are advantageously adjusted to their optimal value with a tolerance of less than about ten percent.

According to a favorable embodiment, the balls show an angle of contact higher or equal to 25 degrees, so as to limit the mass and size of the bearing while ensuring a good rigidity.

In a preferred embodiment, at least one of the rings, and preferably each of the rings, of at least one rolling bearing, is free to move along the axial direction in relation to the other rings, for example by a sliding fit with respect to its base (hub or shaft).

To maintain this sliding fit, it will be advantageous for the shaft, hub, and rings to be made of the same materials, or materials having substantially the same coefficient of thermal expansion.

According to an advantageous embodiment, mounting flanges are used to clamp the bearing rings onto the spacers and these flanges have significantly lower stiffness (typically at least three times less) than the axial stiffness of the spacers.

To ensure that the preload remains insensitive to a temperature excursion, it will be advantageous for the rings and balls to be made of the same materials or of materials having substantially the same coefficient of thermal expansion.

So that the preload remains insensitive to a temperature excursion even when the rings and balls are not made of the same materials or of materials having substantially the same coefficient of thermal expansion, it will be advantageous to maintain the bearing temperature close to a given average temperature, within the range of the temperature gradients.

Advantageously, the lengths of the two spacers are identical, within the tolerances of machining errors.

According to a preferred embodiment, the rolling bearings have identical dimensions, and the bearing comprises for each group of two rolling bearings spaced along the axial direction Z, two cylindrical and coaxial spacers.

According to an advantageous embodiment, the bearing comprises at least between the central shaft and the inner spacer, or between the two spacers, or between the outer spacer and the hub, clearances designed to permit differential radial expansion of at least one of the spacers in relation to the other spacer or to the central shaft or to the hub.

According to an advantageous embodiment, one of the rolling bearings is simply held in place on one side by the spacers and on the other side by clamps, these clamps having a significantly lower stiffness (typically at least three times less) than the axial stiffness of the spacers.

According to a favorable embodiment, one of the rolling bearings, designated "upper", is simply held in place on one side by the spacers and on the other side by clamps, the other bearing, designated "lower", is simply held in place on one side by the spacers, and on the other side by shoulders provided in the central shaft and the hub, the assembly comprising the lower bearing, the spacers and the upper bearing thus forming a substantially cylindrical volume, whose thickness is equal to the thickness e of a bearing, and fitting into a housing of corresponding shape within the space between the central shaft and the hub.

The invention also aims at a process for manufacturing a rolling bearing device of the type comprising a central shaft and a hub, mobile in rotation relative to each other, in which the device comprises at least two rolling bearings, one designated "lower" and the other designated "upper", arranged between the central shaft and the hub in two positions spaced in the axial direction Z. These rolling bearings are equipped with inner and outer rings and with balls, the inner ring of each rolling bearing is adjusted around the central shaft and the outer ring inside the hub, the rolling bearings are mounted back-to-back or face-to-face, a rigid preload is applied to these rolling bearings in the axial direction, spacers are placed between these rolling bearings, a spacer designated "inner" rests, by its upper and lower ends, on the inner rings of the upper and lower rolling bearings, respectively; a spacer designated "outer" rests, by its upper and lower ends, on the outer rings of the upper and lower rolling bearings, respectively.

The process comprises a step of computation of the lengths of the internal and external spacers, so as to minimize the variations of rigid preload of the bearings caused by predetermined temperature gradients from one point of the rolling bearing to another, particularly temperature gradients along a radial direction, this minimization involving a compensation of preload variations, being understood that, for the optimum length of the spacers, the effect of the differential axial expansion of the spacers on the preload, going in the direction of an increased preload, will offset the effect of differential radial expansion of the rings on this same preload, along the lines of a decreased preload.

BRIEF DESCRIPTION OF THE FIGURES

The goals and advantages of the invention will be better understood in reading the description and drawings of a particular embodiment, given as a non-limiting example, for which the drawings show:

FIG. 1: a cross-section view of a rolling bearing in a non-preloaded (FIG. 1a) and in a preloaded (FIG. 1b) configuration;

FIG. 2: a cross-section view of a rolling bearing according to the invention;

DETAILED DESCRIPTION OF AN EMBODIMENT OF THE INVENTION

Figure 3:
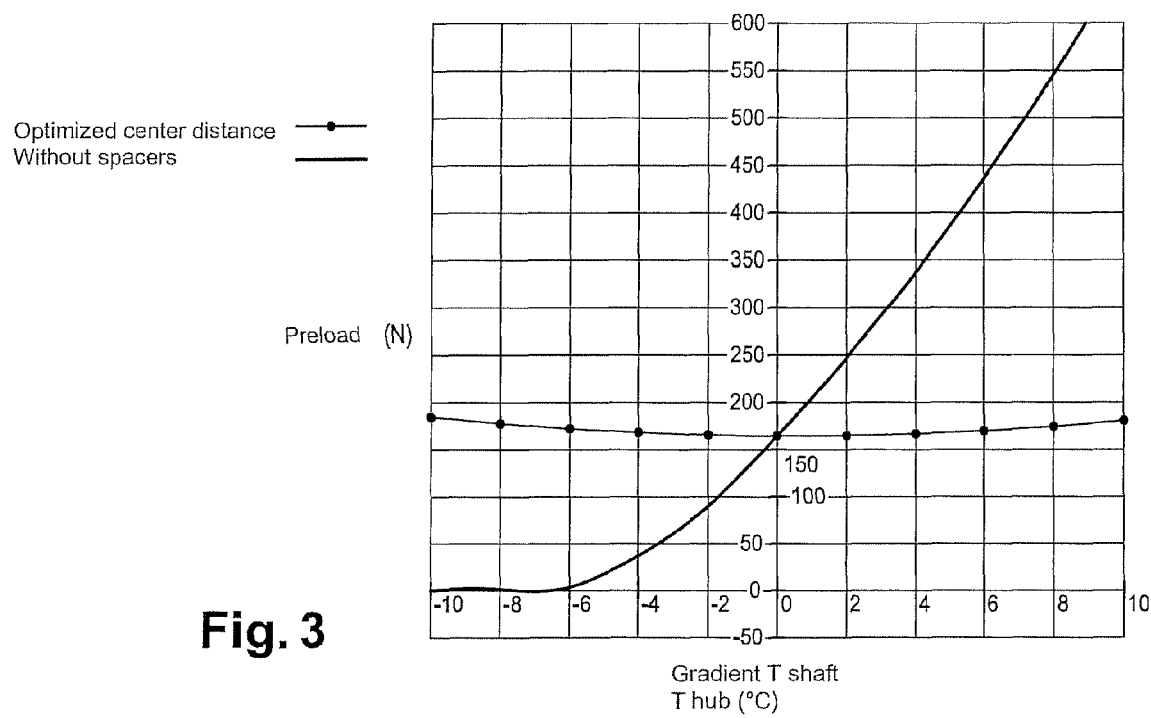
FIG. 3: a graph illustrating the sensitivity of the preload to a temperature gradient, in one case without spacers (with the two rolling bearings juxtaposed), in the other case for spacers with an adjusted length.

As shown in FIG. 2, the invention relates to a rolling bearing device comprising a hub 10, mobile in rotation around a central shaft 11. For simplicity, FIG. 2 only shows the central part of the hub 10.

The central shaft 11 and the hub 10 are designed in conventional fashion and in materials not detailed here, metallic or other. Advantageously, the hub and shaft are made of the same material, e.g. stainless steel (10.4 µm/m/C), or from different materials having substantially the same coefficient of thermal expansion, which greatly facilitates the design processes.

For the remainder of the description, the axis of rotation of the hub 10 about the central shaft 11 is designated Z, and the terms "radial" and "axial" are defined with reference to this axis of rotation Z.

The rolling bearing here comprises two bearings: the lower 12 and the upper 13, respectively, with identical dimensions.

Ball-type bearings are referred to herein, but it is clear that other types of rolling bearings, e.g. taper rollers, are possible without changing the principle of the invention. The rolling bearings 12, 13 are assumed to have inner 14, 16 and outer 15, 17 metal rings, e.g. made of stainless steel, and balls 18, 19 also made of stainless steel. The bearings' lubrication method is not detailed here.

The inner rings (respectively outer) are fitted around the shaft (respectively inside the hub) with a sliding contact having a small enough amount of clearance (typically a few microns) to avoid any damage to the bearing during lateral movements (in the radial direction) for example under the effect of external vibrations or shocks, but large enough for at least one of the rings and preferably each of the rings of at least one of the rolling bearings to be free to move along the axial direction in relation to the other rings.

Advantageously, the material of the bearing rings has substantially the same coefficient of thermal expansion as the material used for the shaft and the hub, so the adjustment play between the inner rings and the shaft on the one hand, and between the outer rings and the hub on the other hand, is substantially constant during temperature excursions.

It is understood that the inner ring 14, 16 of each rolling bearing 12, 13 is fixed and that the outer ring 15, 17 is mobile in rotation, integrally with the hub 10. The detailed geometrical features of the rolling bearings 12, 13 are outside the context of this invention and are therefore not described further herein.

The rolling bearings 12, 13 are mounted in a manner similar to the arrangement of FIG. 1, i.e. back-to-back. The normals to contact A1, A2 with the bearings 12, 13 balls are concurrent towards the outside of the hub 10. A rigid preload of the type described above is applied to these bearings 12, 13 using clamps 20, 21. The details of these members and of their mode of operation are known to the skilled person and are therefore not detailed further herein.

In order to separate the rolling bearings 12, 13, for example to achieve high pointing accuracy of the paired bearing and to realize the rigid preload giving high rocking stiffness to the bearing and to the structure, two coaxial cylindrical members 22, 23, called "spacers", are interposed between these bearings. On the bearing shown in FIG. 2, the inner spacer 22, resting on the inner rings 14, 16, is fixed. The outer spacer 23, resting on the outer rings 15, 17, is mobile in rotation integrally with these rings.

As can be seen in FIG. 2, these two spacers—inner 22 and outer 23—each rest on a ring of each bearing. The inner spacer 22 rests by its upper and lower ends, on the inner rings 16, 14, of the upper 13 and lower 12 rolling bearings respectively. Similarly, the outer spacer 23 rests by its upper and lower ends, on the outer rings 17, 15, of the upper 13 and lower 12 rolling bearings respectively.

Mounting flanges 20, 21 are used to clamp the bearing rings onto the spacers 22, 23. Their stiffness is lower than the spacers' axial stiffness, typically at least three times lower than the axial stiffness of the spacers. In this way, the expansion of the spacers, which will be seen to play an essential role in maintaining the preload, will be only slightly affected by the stiffness of the flanges.

The lengths of the spacers are advantageously the same, within the tolerances of machining errors. In this way, the preload that would be achieved by clamping the rolling bearings against each other as in FIG. 1 is achieved in the same way by clamping the rolling bearings against the spacers, using the clamps, regardless of the relative arrangement of the shoulders on which the lower bearing rings rest before tightening. On tightening, the hub and the shaft will adjust themselves automatically in the radial direction.

In a different embodiment, the lengths of the two spacers are different, but adjusted such that the desired preload is achieved when the bearing is assembled.

In this non-limiting example of the implementation of the invention, the central shaft 11 comprises a recess 24 of substantially cylindrical shape, arranged in line with the inner spacer 22. Similarly, the hub 10 comprises a recess 25 of substantially cylindrical form in line with the outer spacer 23. Finally, spacers 22, 23 are separated by a space also of substantially cylindrical shape 26.

In addition to these recesses, there are clearances, not shown in FIG. 2, of a few tenths of a millimeter (typically 0.2 to 0.5 mm) between the spacers, the shaft and the hub allowing a radial differential expansion of the spacers 22, 23, the central shaft 11 and the hub 10. In the most general case of assembly, some play exists advantageously between any pair of adjacent members: shaft, inner spacer, outer spacer, hub. It will be understood that if, at the time of assembly, two adjacent members are touching, but there is at least sufficient clearance between two other adjacent members, this will allow all the members to reposition themselves under the effect of radial expansion without causing excessive forces or deformation of the members.

It is also understood that the upper rolling bearing 13 is simply held in place in the axial direction by the spacers 22, 23, on the one hand, and the clamps 20, 21, on the other hand. Similarly, the lower rolling bearing 12 is simply held in place by spacers 22, 23 on the one hand and by shoulders 27, 28 provided on the central shaft 11 and the hub 10. The assembly comprising the lower rolling bearing 12, the spacers 22, 23 and the upper rolling bearing 13 thus forms a substantially cylindrical volume whose thickness is equal to the thickness e of a rolling bearing (see FIG. 1), and fits into a housing of corresponding shape within the space between the central shaft 11 and the hub 10.

This arrangement allows easy mounting of the rolling bearing.

It is also understood that at least one rolling bearing, in this case the upper rolling bearing 13, is simply adjusted by sliding contact with the shaft and hub, such that an axial movement of a ring of the rolling bearing relative to the other ring is only prevented by the resistance to sliding between said ring and shaft or hub. Thus, at least one of the rings and advantageously each of the rings of at least one rolling bearing is free to move along the axial direction in relation to the other rings over at least a predefined length because of this slipping adjustment, according to the axial expansion play of the spacers. Because of this relative movement of one of the rings relative to the other rings, the spacers' axial expansions play will be transmitted to the rolling bearing rings.

To limit the potential stresses acting on the relative movements of the rolling bearing rings with the shaft or hub, it will be advantageous for the shaft, hub, and rolling bearing rings to be made of the same materials, or of materials having substantially the same coefficient of thermal expansion.

The materials of which the spacers 22, 23 are made are not necessarily the same as those of the shaft, hub or rings. They are chosen so they can be rectified with great precision. Indeed, it must be possible to control the lengths of the two spacers 22, 23 with great accuracy. Each spacer 22, 23, in this example, consists of two stainless steel cylinders (10.4 μm/m/C).

Other choices of materials are possible with, as a non-limiting example, austenitic steels (15 to 17 μm/m/C), TA6V titanium alloy (8.8 μm/m/C) or the range of Aluminum-silicon alloys (4 to 23 μm/m/C)

Operating Mode

During a temperature excursion of the entire rolling bearing in the case where this is made of the same materials, there is no differential expansion of any elements relative to others, and in this case, the preload remains constant. Similarly, when the bearing is made of materials which may be different, but the average temperature of the bearing varies little, the preload also remains constant.

However, when a temperature gradient develops between the shaft and hub, assumed for example to be made of the same materials, the shaft being for example colder than the hub by a few degrees, typically up to 10° C., the balls being assumed to be at an average temperature, the temperature of the inner rings in thermal contact with the shaft will be lower than that of the outer rings in thermal contact with the hub; this will mainly generate a differential expansion of the rings in the radial direction, with the effect of a decrease in the preload, the outer rings expanding more than the inner rings in the case in question. However, the inner spacers in thermal contact with the inner rings and the shaft and the outer spacers in thermal contact with the outer rings and with the hub will be at different temperatures and will therefore expand differently in the axial direction. In the case in question, the outer spacers will expand more than the inner spacers, all the more if their length is greater. This effect will result in an increased preload, all the greater if the length of the spacers is large. It is therefore understood that for an optimum length of the spacers, the effect of the differential axial expansion of the spacers on the preload, going in the direction of an increased preload, will offset the effect of differential radial expansion of the rings on this same preload, along the lines of a decreased preload.

It is clear that the reasoning just described is also valid when the shaft is hotter than the hub.

It is also clear that the compensation of the temperature gradient will occur in the same way close to any average temperature of the bearing.

The skilled person will also understand that the invention applies in cases where the rings and balls are not made of the same material, with different thermal expansion coefficients, simply by ignoring the effects of differential thermal expansion between the rings and balls, which are of secondary importance when considering a gradient of about ten degrees typically.

In this way, judiciously choosing the length of the spacers makes possible a rigid preload that is relatively unaffected by temperature gradients in the rolling bearing.

As there is always some degree of uncertainty regarding knowledge of certain elements such as the contact angle of the balls (known to within few degrees), adapting the length of the spacers according to the invention will not necessarily lead to an exact compensation of the temperature gradient effect on the preload. High-quality manufacturing and testing of the rolling bearings will allow limiting to less than 5 to 10% the variations of the rigid preload caused by temperature gradients from one point of the bearing to another, particularly for thermal gradients in the radial direction. However, limiting the variations of the preload to less than 30% will be currently achieved for the type of bearing according to the invention by a standard implementation. In particular, it is acceptable for the length of the spacers to be adjusted to their optimum value within a tolerance of less than about ten percent.

If the adjustment of the length of the spacers leads to a value that is too small compared to the desired rocking stiffness, it will be advantageous to reduce the contact angle of the balls, typically to between 20 and 30 degrees. If, on the contrary, the length of the spacers leads to a value that is too large compared to a desired size, it will be advantageous to increase the contact angle of the balls, typically to between 30 and 40 degrees.

FIG. 3 shows for example two cases of changes in the preload (with and without spacer) for a bearing made of stainless steel (10.4 μm/m/C) of the type in FIG. 2 that has the following features: stainless steel bearing rings (10.4 μm/m/C), type Si3N4 ceramic balls with a contact angle α of 25°, inner rolling bearing diameter of 50 mm, outer rolling bearing diameter of 72 mm, with 21 7.14 mm diameter balls per row, stainless steel spacers (10.4 μm/m/C). In the case without spacers (12 mm center distance), sensitivity to the temperature gradient is very high. In the other case with spacers such that the center distance is 112 mm, change in the preload according to the gradient is minimized. These charts can be obtained by analytical calculations or by testing for example.

ADVANTAGE OF THE INVENTION

Using a rigid preload and spacers serving to separate the rolling bearings allows a very high level of rigidity of the bearing which is beneficial when it is subjected to severe vibration environments.

According to the invention, this length will be adjusted so as to make the preload insensitive to thermal gradient effects, which will increase significantly the accuracy and life duration of the rolling bearings by keeping this preload to an optimal level for the desired operation.

EMBODIMENT VARIANTS

The scope of this invention is not limited to the details of the forms of embodiment considered above as an example, but on the contrary extends to modifications in the reach of the man skilled in the art.

The invention is also applicable to tapered rolling bearings.

The invention claimed is:

1. A rolling bearing device of the type having a central shaft and a hub that are mobile in rotation relative to each other, comprising:
    an upper rolling bearing and a lower rolling bearing, arranged between the central shaft and the hub in two positions spaced in an axial direction (Z), said upper and lower rolling bearings each having inner and outer rings and each having balls, the inner ring of each rolling bearing being adjusted around the central shaft and the outer ring of each rolling bearing being inside the hub, the upper and lower rolling bearings being mounted back-to-back, a rigid preload being applied to said upper and lower rolling bearings in the axial direction,
    spacers being placed between said upper and lower rolling bearings,
    whereby an inner spacer resting, by upper and lower ends of said inner spacer, on the inner rings of the upper and lower rolling bearings, respectively, and a outer spacer resting, by upper and lower ends of the lower spacer, on the outer rings of the upper and lower rolling bearings, respectively,
    wherein lengths of both the inner and outer spacers are adjusted to limit variations in rigid preload caused by temperature gradients in the radial direction from one point of the bearing to another to less than 30%, whereby for an optimum length of the spacers, an effect of differential axial expansion of the spacers on the preload, in a direction of an increased preload, will offset an effect of differential radial expansion of the rings on the same preload along lines of a decreased preload.

2. The rolling bearing device according to claim 1, wherein the lengths of the spacers are advantageously adjusted to an optimal value with a tolerance of less than about ten percent.

3. The rolling bearing device according to claim 1, wherein the balls show an angle of contact chosen to be higher or equal to 25 degrees, so as to limit the mass and size of the bearing while ensuring a good rigidity.

4. The rolling bearing device according to claim 1, wherein at least one of the rings of at least one rolling bearing is free to move along the axial direction (Z) in relation to the other rings.

5. The rolling bearing device according to claim 1, wherein the shaft, hub, and rings are made of same materials, or materials having a substantially same coefficient of thermal expansion.

6. The rolling bearing device according to claim 1, wherein the lengths of the two spacers are identical within tolerances of machining errors.

7. The rolling bearing device according to claim 1,
    wherein the rolling bearings have identical dimensions, and
    wherein the bearing comprises for each group of two rolling bearings spaced along the axial direction (Z), two cylindrical and coaxial spacers.

8. The rolling bearing device according to claim 1, wherein the bearing comprises at least, between the central shaft and the inner spacer, or between the two spacers, or between the outer spacer and the hub, clearances sufficient to permit differential radial expansion of at least one of the spacers in relation to the other spacer or to the central shaft or to the hub.

9. The rolling bearing device according to claim 1, wherein one of the rolling bearings is held in place on one side by the spacers and on the other side by clamps, said clamps having a significantly lower stiffness than the axial stiffness of the spacers.

10. The rolling bearing device according to claim 9, wherein the clamps have a lower stiffness at least three times less than the axial stiffness of the spacers.

11. The rolling bearing device according to claim 1, wherein the upper rolling bearing is held in place on one side by the spacers and on the other side by clamps, the lower bearing is held in place on one side by the spacers, and on the other side by shoulders provided in the central shaft and the hub, the assembly comprising the lower rolling bearing, the spacers and the upper rolling bearing thus forming a substantially cylindrical volume having a thickness equal to a thickness of a rolling bearing, and fitting into a housing of corresponding shape within the space between the central shaft and the hub.

12. The rolling bearing device according to claim 1, wherein the lengths of both the inner and outer spacers are adjusted to limit variations in rigid preload caused by temperature gradients from one point of the bearing to another in a radial direction to less than 30%.

13. A process for manufacturing a rolling bearing device of the type comprising a central shaft and a hub, mobile in rotation relative to each other, in which the bearing comprises an upper rolling bearing and a lower rolling bearing, each of said upper rolling bearing and said lower rolling bearing arranged between the central shaft and the hub in two positions spaced in an axial direction (Z), said upper rolling bearing and said lower rolling bearing being equipped with inner and outer rings and with balls, the inner ring of each rolling bearing adjusted around the central shaft and the outer ring inside the hub, the rolling bearings being mounted back-to-back, a rigid preload applied to said rolling bearings in the axial direction, spacers being placed between said rolling bearings, whereby an inner spacer rests, by upper and lower ends of said inner spacer, on the inner rings of the upper and lower rolling bearings, respectively, and an outer spacer rests, by upper and lower ends of said outer spacer, on the outer rings of the upper and lower rolling bearings, respectively, the process comprising:
- a step of computing the lengths of the inner and outer spacers so as to minimize variations of a rigid preload of the rolling bearings caused by predetermined temperature gradients in the radial direction from one point of the rolling bearing to another,
- said minimization comprising a step of compensating for preload variations wherein, for an optimum length of the spacers, an effect of a differential axial expansion of the spacers on the preload, in a direction of an increased preload, will offset an effect of differential radial expansion of the rings on the same preload along lines of a decreased preload.

14. The rolling bearing device according to claim 13, wherein the lengths of both the inner and outer spacers are adjusted to limit variations in rigid preload caused by temperature gradients from one point of the bearing to another in a radial direction to less than 30%.

\* \* \* \* \*